US010019746B2

(12) United States Patent
Konaiyagarri et al.

(10) Patent No.: US 10,019,746 B2
(45) Date of Patent: Jul. 10, 2018

(54) MICROSITES ARCHITECTURE

(71) Applicant: Verizon Patent and Licensing Inc., Arlington, VA (US)

(72) Inventors: Sunil Joshua Alexander Konaiyagarri, Piscataway, NJ (US); Bidhu Prasad Mahapatra, Monroe Township, NJ (US); Samar Chowdhury, Piscataway, NJ (US); Shashidhar Hiremath, Piscataway, NJ (US); Viswanadha Reddy Panga, Edison, NJ (US); Sheeba Baby, Somerset, NJ (US); Naveen Kumar Reddy Indurti, Irvine, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 628 days.

(21) Appl. No.: 14/556,935

(22) Filed: Dec. 1, 2014

(65) Prior Publication Data
US 2016/0155178 A1    Jun. 2, 2016

(51) Int. Cl.
G06Q 30/00 (2012.01)
G06F 17/30 (2006.01)
G06Q 30/06 (2012.01)
H04L 29/08 (2006.01)
G06F 3/06 (2006.01)

(52) U.S. Cl.
CPC ........ *G06Q 30/0623* (2013.01); *G06F 3/0658* (2013.01); *G06Q 30/00* (2013.01); *H04L 67/02* (2013.01); *H04L 67/1002* (2013.01)

(58) Field of Classification Search
CPC ................................. G06Q 30/0623
USPC ............................................. 705/26.1
See application file for complete search history.

(56) References Cited

U.S. PATENT DOCUMENTS

| | | | |
|---|---|---|---|
| 7,050,989 B1 * | 5/2006 | Hurt | G06Q 30/02 705/14.51 |
| 8,275,672 B1 * | 9/2012 | Nguyen | G06Q 30/0641 705/26.1 |
| 2002/0052806 A1 * | 5/2002 | Hodson | G06Q 30/06 705/26.8 |

(Continued)

OTHER PUBLICATIONS

"Mary Lovelace, Nicholas Buchanan, IBM Enterprise Content Management and system storage solutions: Working Together, (Sep. 30, 2008), IBM Redbook, pp. 4-54" (Year: 2008).*

*Primary Examiner* — Kathleen Palavecino
*Assistant Examiner* — Jason B Warren

(57) ABSTRACT

Systems and methods for integrating distinct software architectures are disclosed. In some implementations, a content management server receives, from a customer device, a request for a page associated with a product for sale. The content management server transmits, to a search/indexing server, using a bridge, a request to find content for the page associated with the product. The content management server receives a location of the content for the page associated with the product. The content management server transmits, to an ecommerce server, a request for ecommerce functionality for the page. The content management server transmits, to the customer device, data for loading the page associated with the product, the data for loading the page including the content for the page and the ecommerce functionality for the page.

20 Claims, 12 Drawing Sheets

(56) References Cited

U.S. PATENT DOCUMENTS

| | | | |
|---|---|---|---|
| 2006/0059253 A1* | 3/2006 | Goodman | G06Q 10/06 709/223 |
| 2007/0182758 A1* | 8/2007 | Altounian | G06Q 30/06 345/619 |
| 2009/0193063 A1* | 7/2009 | Leroux | G06F 8/67 |
| 2012/0078731 A1* | 3/2012 | Linevsky | G06Q 30/0277 705/14.73 |
| 2013/0290141 A1* | 10/2013 | Bhaskar | G06Q 30/0603 705/26.61 |
| 2014/0379507 A1* | 12/2014 | Pitt | G06Q 30/0601 705/26.1 |

* cited by examiner

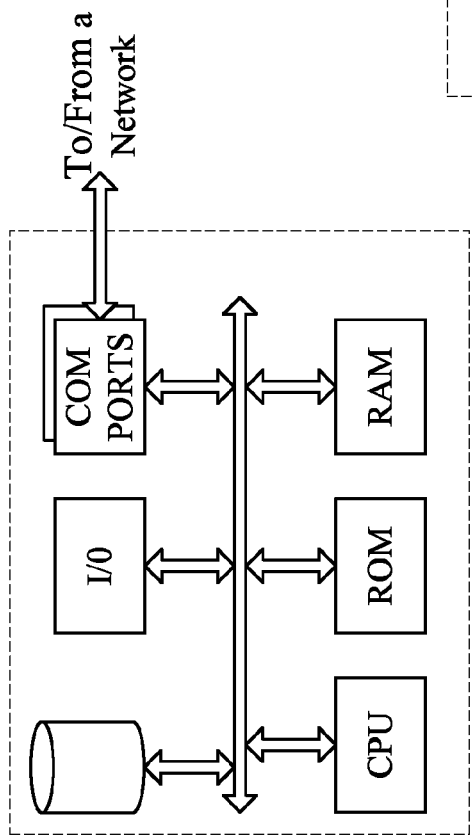
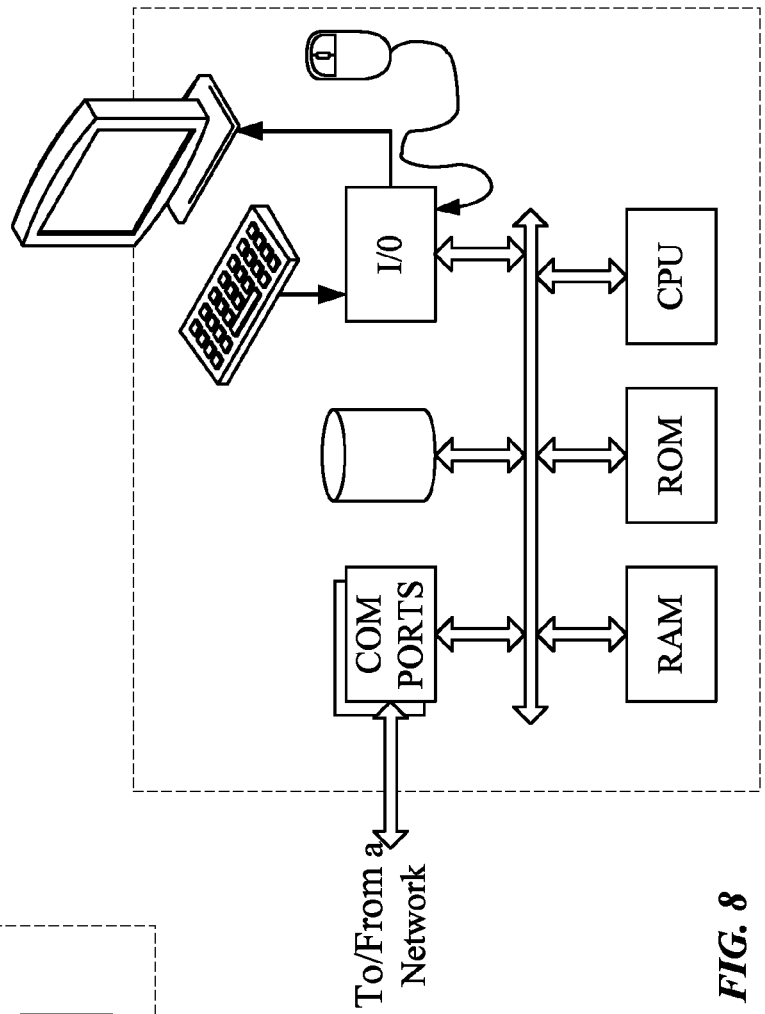
FIG. 7
FIG. 8

MICROSITES ARCHITECTURE

BACKGROUND

Creating a web-based online business platform, for example, for an online store, may require integrating multiple different software systems—for example, a content management system for managing stored content, a search system for searching through the stored content, and an ecommerce system to provide ecommerce functionality (e.g., shopping cart, payment processing, etc.). Oftentimes, these different software systems are written by different vendors and are not integrated. However, these different software systems need to communicate with one another in order for the web-based online business platform to function. As a result, some online business platforms may select to use lower quality software systems that can more easily be integrated with one another. This is problematic because it results in the online business platforms having lower quality software. As the foregoing illustrates, a new approach for integrating multiple different software systems may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7 is a simplified functional block diagram of a computer that may be configured to function a server computing device;

FIG. 8 is a simplified functional block diagram of a personal computer or other work station or terminal device, which may be configured to function as the server computing device;

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for integrating multiple different software systems, for example, in an online business context. According to some implementations, a CQ5® content management server that stores content describing products for sale, an Endeca® search/indexing server that indexes the content, and an Art Technology Group® (ATG®) ecommerce server that provides ecommerce functionality, such as creating a shopping cart, creating a wish list, billing, storing payment information, etc., are combined into a single online business system. However, the CQ5®, Endeca®, and ATG® software are not configured to work together and may not be able to communicate with one another. In some prior art schemes, CQ5®, Endeca®, and ATG® software operate independently of one another, on different pages or different machines, and interaction between the three software architectures is accomplished manually (e.g., by a user re-typing information or by showing content associated with different software architectures at different pages). In other words, in some prior art schemes, each of the CQ5® server, the Endeca® server, and the ATG® server communicated independently with the client computing device(s) but did not communicate among one another. According to some implementations of the subject technology, a bridge software module is added to the CQ5® content management server. The bridge is able to communicate with the software on the CQ5® content management server, with the software on the Endeca® search/indexing server, and with at least the shopping cart functionality of the ATG® ecommerce server.

Advantageously, as a result of some implementations of the subject technology, CQ5®, Endeca®, and ATG® may be combined to create an online business system, such as an online store. A customer accessing the online store or a content developer adding a description of a product to the online store may be able to access the content stored at the CQ5® content management server, the search/indexing functionalities of the Endeca® search/indexing server, and the shopping cart of the ATG® ecommerce server. Functionalities of the ATG® ecommerce server other than the shopping cart may be handled locally at the ATG® ecommerce server.

Figure 1:
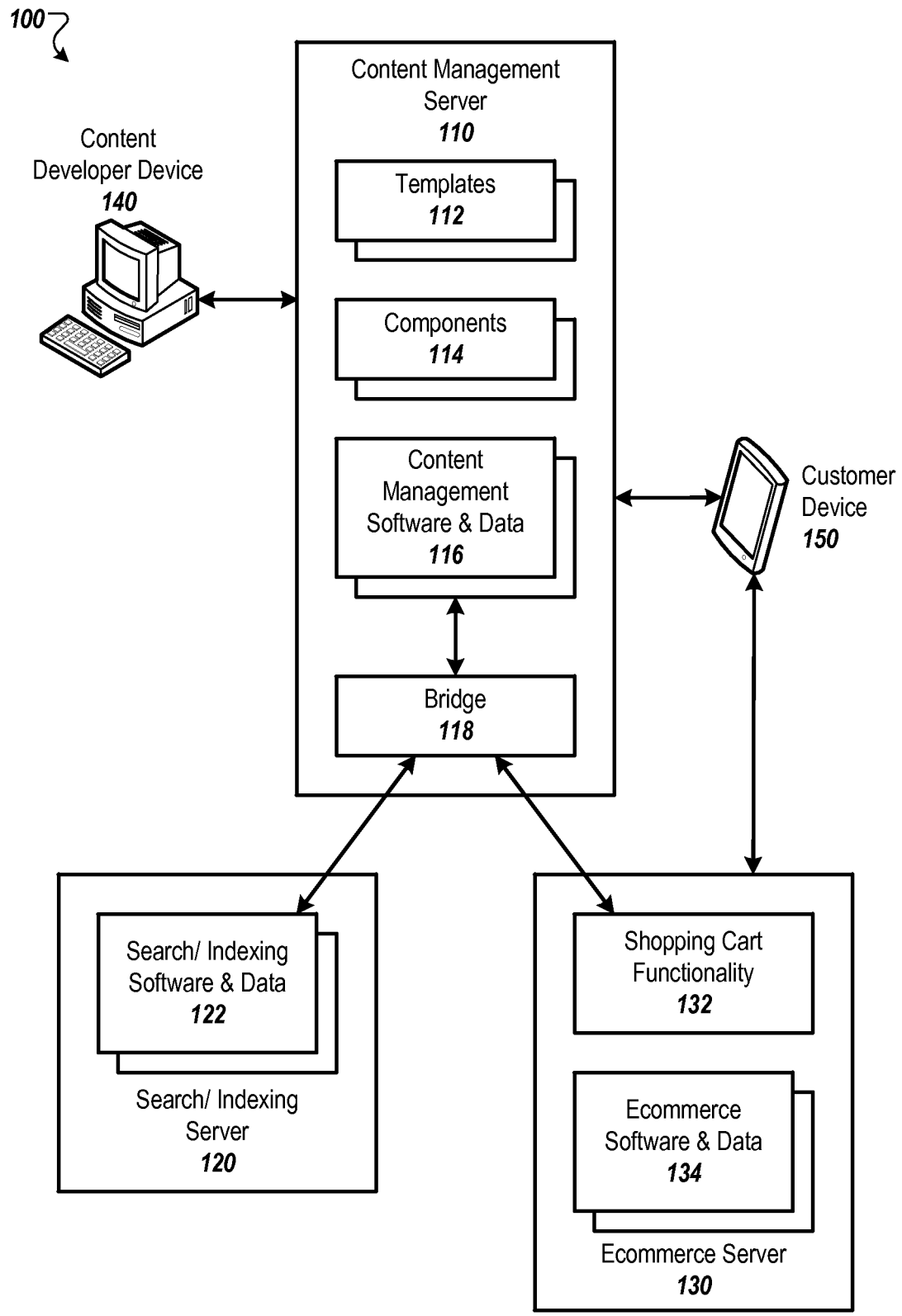
FIG. 1 illustrates an exemplary system configured to integrate multiple online business servers.

FIG. 1 illustrates an exemplary system 100 configured to integrate multiple online business servers. As shown, the system 100 includes a content management server 110 (e.g., CQ5®), a search/indexing server 120 (e.g., Endeca®), an ecommerce server 130 (e.g., ATG®), a content developer device 140, and a customer device 150. The content developer device 140 is a client computing device from which a content developer accesses the system 100, for example, to add a product to be sold by the online business. The customer device 150 is a client computing device from which a customer accesses the system, for example, to learn about the product(s) available for sale or to purchase a product. Either the content developer device 140 or the customer device 150 may be a mobile phone, a tablet computer, a laptop computer, a desktop computer, a personal digital assistant (PDA), a digital music player, etc. While a single content developer device 140 and a single customer device 150 are illustrated, the subject technology may be implemented with multiple content developer devices or with multiple customer devices.

As shown, the search/indexing server 120 stores search/indexing software & data 122. The search/indexing software & data 122 is used to search and index the content stored at the content management server, which is described in detail below. The search/indexing software & data 122 includes program(s) for searching and indexing computerized information.

The ecommerce server 130 stores a shopping cart functionality 132 and other ecommerce software & data 134. The shopping cart functionality 132 includes program(s) for adding a product sold by an online business to a shopping cart. The ecommerce server 130 also stores other ecommerce software & data 134, which may include other ecommerce software for the online business, such as creating a wish list, storing personal information (e.g., billing/payment processing information, shipping address, rewards program membership information, etc.).

The content management server 110 stores templates 112, components 114, content management software & data 116, and a bridge 118. The templates 112 are templates of product description pages, which may be provided to the content developer device 140 when the content developer is developing product descriptions for the online business. The components 114 are components of product description pages (e.g., links, image blocks, video blocks, text blocks, etc.), which may be provided to the content developer device 140 when the content developer is developing product descriptions for the online business. The content management software & data 116 includes the content stored by the content management server 110, such as product description pages, text, images, videos, etc. The bridge 118 includes software or hardware that allows the content management server 110 to communicate with the search/indexing server 120, and at least the shopping cart functionality 132 of the ecommerce server 130. The bridge 118 may be useful when the search/indexing server 120 or the ecommerce server 130 implement programming techniques, programming language, or other software or hardware that is incompatible with the software or hardware of the content management server 110. Example operations of the bridge 118 are described below in conjunction with FIG. 2 and FIG. 3.

Figure 2:
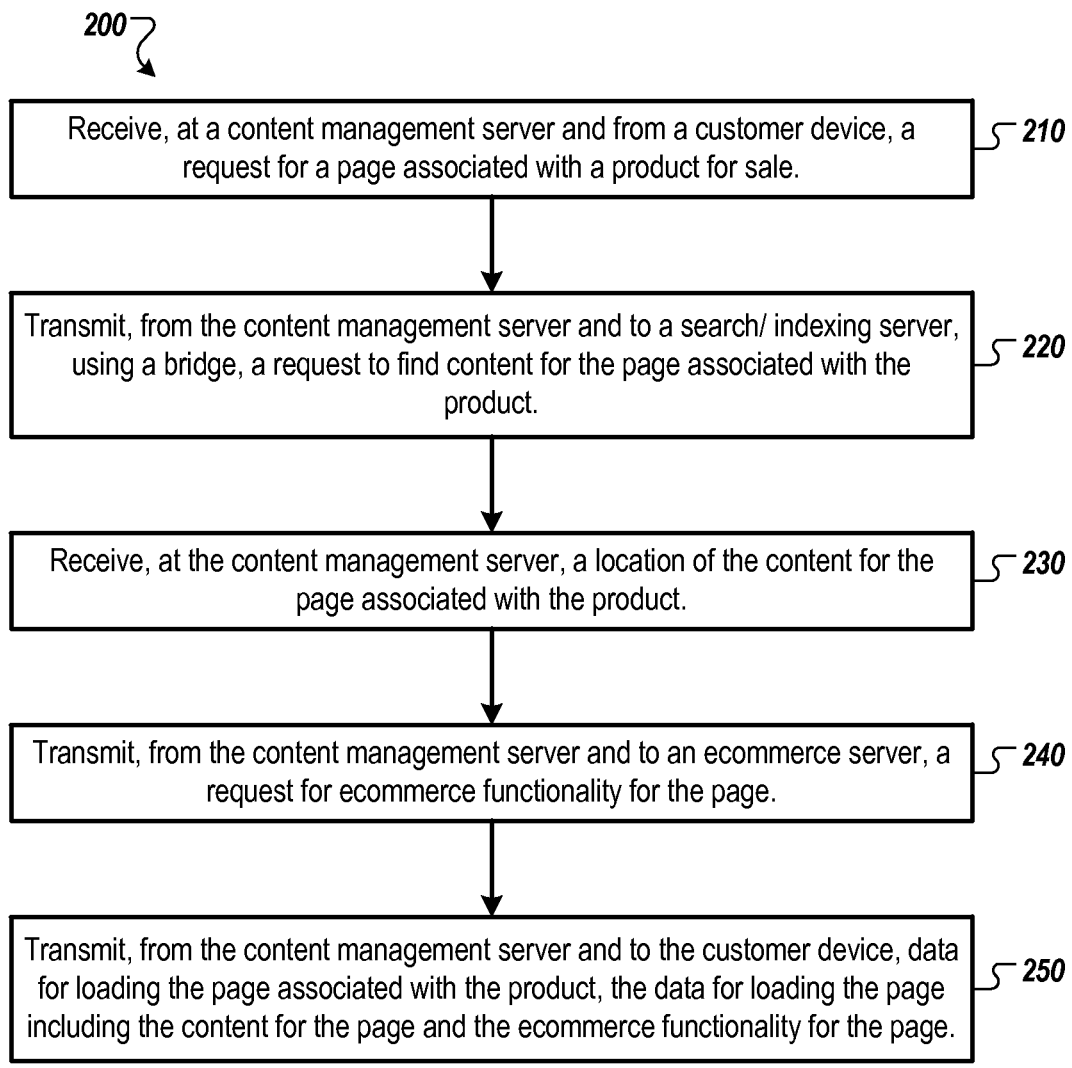
FIG. 2 is an exemplary process for loading a page from a content management server in an online business system.

FIG. 2 is an exemplary process 200 for loading a page (e.g., stored in the content management software & data 116) from a content management server (e.g., content management server 110) in an online business system (e.g., system 100). The page may be loaded, for example, for presentation at a customer device (e.g., customer device 150). The process 200 begins at step 210, where the content management server (e.g., while executing the bridge 118 software) receives, from a customer device (e.g., customer device 150), a request for the page associated with a product for sale. The page may include text and one or more images related to the product. For example, the customer may search for "alarm clock radio" in a search tool of a page associated with an online business.

In step 220, the content management server, using a bridge (e.g., bridge 118), transmits, to a search/indexing server (e.g., search/indexing server 220), a request to find content for the page associated with the product (e.g., the product identified in the "alarm clock radio" query). The bridge may be used for communication between the content management sever and the search/indexing server because the content management server and the search/indexing server may implement incompatible computing techniques, such as software, computing architectures, or programming languages. The bridge includes software or hardware that allows for communication between these incompatible computing techniques. The bridge corresponds to one distinction of the subject technology from prior art schemes because the bridge allows the content management server, the search/indexing server, and the ecommerce server to communicate with one another while maintaining different computer architectures or programming techniques. In some prior art schemes, in order for different servers to communicate with one another, the different servers needed to have compatible computer architectures or programming techniques.

In step 230, the content management server receives a location of the content for the page associated with the product. The location may include, for example, a uniform resource locator (URL) or an Internet Protocol (IP) address. The location may be received from the search/indexing server. The content management server may access the location of the content in order to provide the content to the customer device.

In step 240, the content management server transmits, using the bridge, to an ecommerce server (e.g., ecommerce server 130), a request for ecommerce functionality for the page. The ecommerce server may transmit, using the bridge, the ecommerce functionality to the content management server. The ecommerce functionality may include a shopping cart functionality, such as an "add to cart" button, allowing the user to easily add the product for sale to his/her shopping cart for purchase. In some cases, only the shopping cart functionality may be transmitted from the ecommerce server to the content management server and other ecommerce functionality (e.g., billing, collection of shipping information, etc.) may reside at the ecommerce server and be handled by the ecommerce server when/if it is needed. Alternatively, the other ecommerce functionality may also be transmitted to the content management server through the bridge.

According to some implementations, in a "minimum integration design," when the software developer wishes to minimize interaction between the content management server and the ecommerce server, only the shopping cart functionality is transmitted from the ecommerce server to the content management server. The "minimum integration design" may be used, for example, when different software companies or different teams of programmers at the same company are used to develop the content management server and the ecommerce server. The "minimum integration design" may also be used when communication between the ecommerce server and the content management server is expensive, for example, if one of the servers is in a remote geographic location with poor connectivity (e.g., at most 4 megabits per second).

According to other implementations, in an "integrated design," the shopping cart functionality and other ecommerce functionality, such as billing, collection of shipping information, etc., are transmitted from the ecommerce server to the content management server through the bridge. The "integrated design" may be used, for example, when the same software company or the same team of programmers at the same company are used to develop the content management server and the ecommerce server. The "integrated design" may also be used when communication between the ecommerce server and the content management server is inexpensive, for example, if both servers are proximate to one another and connected to a high speed network (e.g., at least 10 megabits per second).

In some examples, the content management server transmits, to the ecommerce server, the request for the ecommerce functionality using an AJAX (Asynchronous JavaScript and XML) call. The content management server receives the ecommerce functionality, from the ecommerce server and in response to the request, via a jQuery. Alternatively, communication techniques different from AJAX and jQuery may be used.

In step 250, content management server transmits, to the customer device, data for loading the page associated with the product. The data for loading the page includes the content of the page and the ecommerce functionality (e.g., shopping cart functionality) for the page. The page may be loaded at the customer device, for example, using a browser or a special-purpose application (e.g., mobile phone or tablet computer application) at the customer device.

In some cases, the content management server receives, from the customer device, a request to implement the ecommerce functionality. For example, a user of the customer device may request to add the product to the shopping cart. The content management server transmits, to the ecommerce server, a signal to handle the request to implement the ecommerce functionality, for example, a signal to add the product to the shopping cart. The ecommerce server then implements the ecommerce functionality. After step 250, the process 200 ends.

Figure 3:
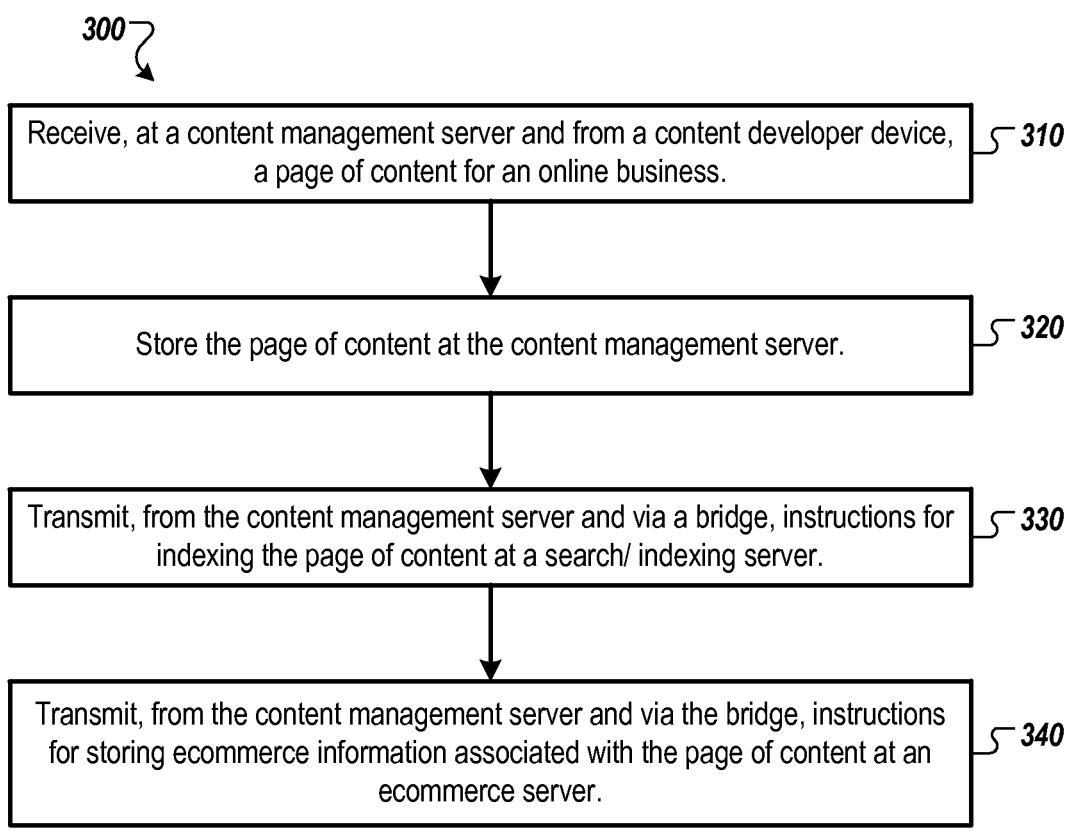
FIG. 3 is an exemplary process for storing a page at a content management server in an online business system.

FIG. 3 is an exemplary process 300 for storing a page at a content management server (e.g., content management server 110) in an online business system (e.g., system 100). The stored page may be created by a content developer at a content developer device (e.g., content developer device 140) and may include a newly-created page or a page that has been previously stored at the content management server and is now being modified (e.g., to include additional information about a product). The process 300 begins at step 310, where the content management server receives, from a content developer device (e.g., content developer device 140), a page of content for an online business. The page may describe a product sold via the online business and may be constructed using one or more templates (e.g., templates 112) or one or more components (e.g., components 114) from the content management server. In some cases, the content management server may transmit, to the content developer device, the one or more templates or the one or more components for constructing the page.

In step 320, the page is stored at the content management server (e.g., among the content management software & data 116). The page may be available to the public for access via a network to which the content management server is connected. The network may include the Internet, an intranet, a wide area network, a local area network, a cellular network, a virtual private network, etc.

In step 330, the content management server transmits, via a bridge (e.g., bridge 118), instructions for indexing the page of content at a search/indexing server (e.g., search/indexing server 120). The bridge may be used to allow communication between the content management server and the search/indexing server, which may implement incompatible software architectures that may not easily communicate with each other. The bridge communicates with software at the content management server, software at the search/indexing server, and software at an ecommerce server. The bridge includes software or hardware for communication between machines implementing incompatible software architectures or programming techniques.

In step 340, the content management server transmits, via the bridge, to the ecommerce server (e.g., ecommerce server 130), instructions for storing ecommerce information associated with the page of content. The ecommerce information may include software to add the product described on the page to a shopping cart. After the page is indexed and the ecommerce information associated with the page is stored, the page may be published for display to at least one customer device (e.g., customer device 150) accessing the content management server via a network.

In some implementations, the content management server, the search/indexing server, and the ecommerce server implement incompatible programming languages or computing architectures that are unable to communicate with one another. The bridge is compatible and able to communicate with the content management server, the search/indexing server, and at least a shopping cart of the ecommerce server. For example, the content management server may be an Adobe CQ5® server, the search/indexing server may be an Oracle Endeca® server, and the ecommerce server may be an Oracle ATG® server. After step 340, the process 300 ends.

The bridge may include software for communicating with each of Adobe CQ5®, Oracle Endeca®, and Oracle ATG®. As illustrated, the bridge resides at the content management server. However, in alternative implementations, the bridge may reside at the search/indexing server or the ecommerce server. In some implementations, multiple bridges may reside at two or more of the content management server, the search/indexing server or the ecommerce server. As described in conjunction with FIGS. 1-3, the bridge resides at the content management server, which interfaces with the content developer device(s) and the customer device(s) and carries out the processes 200 and 300. However, in alternative implementations, the search/indexing server or the ecommerce server may host a bridge, allowing the search/indexing server or the ecommerce server to carry out all or a portion of the steps of the processes 200 and 300. For example, the step 210—"receiving a request for a page associated with a product for sale"—may be carried out by the ecommerce server receiving a request from a customer device. The step 310—"receiving a page of content for an online business"—may be carried out at the search/indexing server, which may receive the page together with information for indexing the page. The information for indexing the page may include keywords, such as "alarm clock," "clock radio," and "clock" for describing an alarm clock radio. In some cases, multiple bridges may be used for example, to allow for separation of the functionality of the processes 200 and 300 across the content management server, the search/indexing server, and the ecommerce server. For instance, the ecommerce server may carry out step 210, the search/indexing server may carry out step 310, and the content management server may carry out the remaining steps 220-250 and 320-340.

Figure 4:
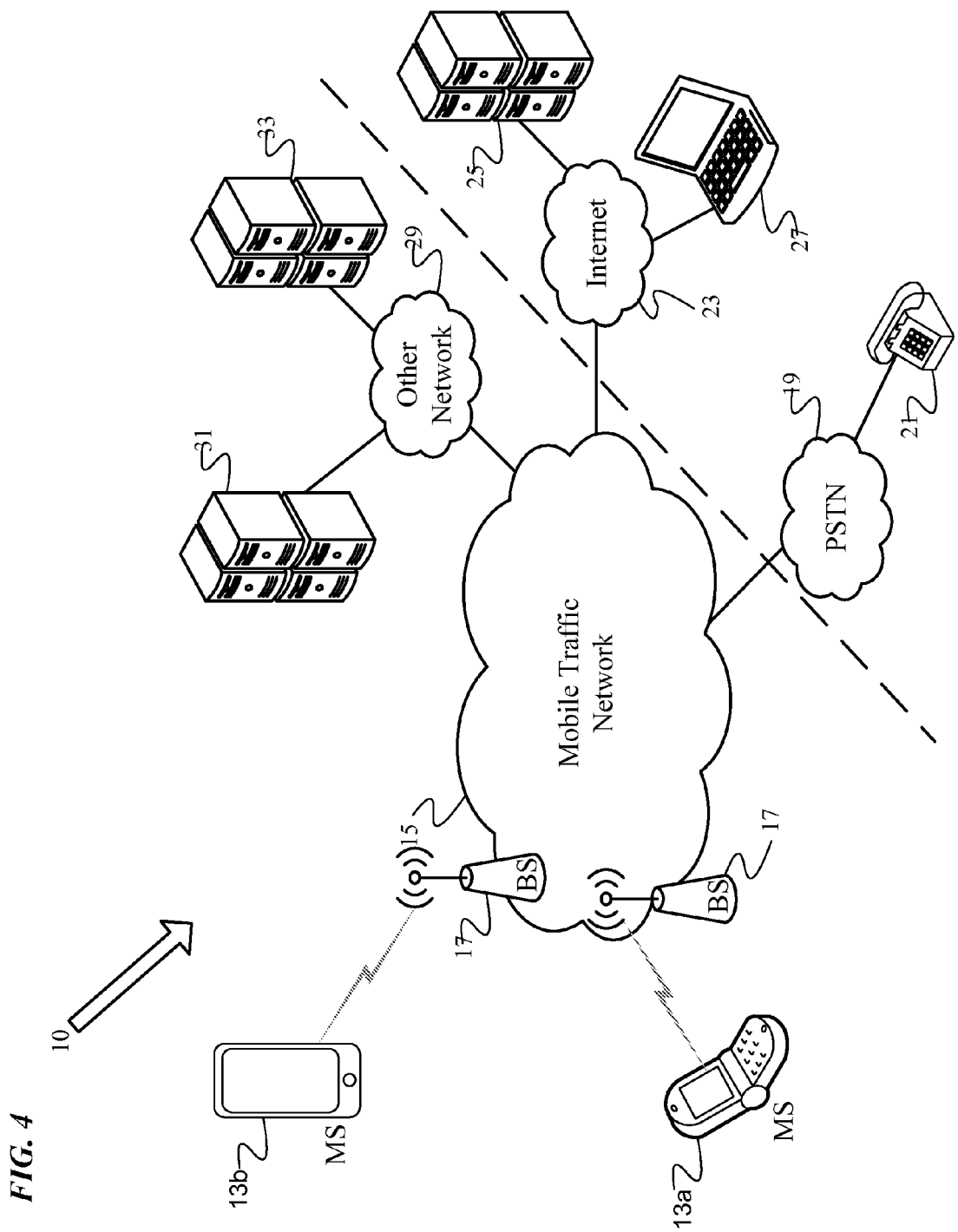
FIG. 4 is a high-level functional block diagram of an exemplary system of networks/devices that provide various communications for mobile stations in an online business system.

FIG. 4 illustrates an exemplary system 10 offering a variety of mobile communication services in an online business system (as illustrated, for example, in FIG. 1). The servers illustrated in FIG. 4 may correspond to the servers of FIG. 1, and the mobile stations and personal computers of FIG. 4 may correspond to the customer device 150 or the content developer device 140 of FIG. 1. The example of FIG. 4 shows two mobile stations (MSs) 13a and 13b as well as a mobile communication network 15. The network 15 provides mobile wireless communications services to those stations as well as to other mobile stations (not shown), for example, via a number of base stations (BSs) 17. Each of the mobile stations 13a and 13b may correspond to the content developer device 140 or the customer device 150 of FIG. 1. The present techniques may be implemented in or used in any of a variety of available mobile networks 15 or non-mobile networks 23 or 29, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Universal Mobile Telecommunications System (UMTS) standard, the LTE standard belonging to 3GPP or other standards used for public mobile wireless communications. The mobile stations 13 may be capable of voice telephone communications through the network 15. Alternatively or additionally, the mobile stations 13a and 13b may be capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks. The user terminal 27 may correspond to the content developer device 140 or the customer device 150 of FIG. 1. The server 25 may correspond to the content management server 110, the search/indexing server 120, or the ecommerce server 130 of FIG. 1.

Mobile stations 13 can take the form of portable handsets, smart-phones or personal digital assistants, although they may be implemented in other form factors. Program applications can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31. The application server 31 may correspond to the content management server 110, the search/indexing server 120, or the ecommerce server 130 of FIG. 1. As illustrated in FIG. 4, the servers 25 and 31 may communicate with one another over one or more networks. Similarly, the content management server 110, the search/indexing server 120, and the ecommerce server 130 of FIG. 1 may communicate with one another over one or more networks. As described in conjunction with FIGS. 1-3, the bridge 118 may be used to facilitate this communication due to the different computing architectures of the servers 110, 120, and 130. The bridge 118 may reside on any one of the servers 110, 120, and 130 or on multiple or all of the servers 110, 120, and 130.

A mobile station 13 communicates over the air with a base station 17 and through the traffic network 15 for various voice and data communications, e.g. through the Internet 23 with a server 25 and/or with application servers 31. Services offered by the mobile service carrier may be hosted on a carrier operated application server 31, for communication via the networks 15 and 29. Server such as 25 and 31 may provide any of a variety of common application or service functions in support of or in addition to an application program running on the mobile station 13. For a given service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10.

As shown by the above discussion, functions relating to MMS communication may be implemented on computers connected for data communication via the components of a packet data network, as shown in FIG. 4. For example, the customer device 150 or the content developer device 140 may correspond to the mobile station 13a or the mobile station 13b. Although special purpose devices may be used, such devices also may be implemented using one or more hardware platforms intended to represent a general class of data processing device commonly used to run "server" programming so as to implement the functions discussed above, albeit with an appropriate network connection for data communication.

The mobile stations 13a and 13b may correspond to the content developer device 140 or the customer device 150 of FIG. 1.

The subject technology may be implemented in conjunction with touch screen type mobile stations as well as to non-touch type mobile stations. Hence, our simple example shows the mobile station (MS) 13a as a non-touch type mobile station and shows the mobile station (MS) 13 as a touch screen type mobile station. Some implementation may involve at least some execution of programming in the mobile stations as well as implementation of user input/output functions and data communications through the network 15, from the mobile stations. Those skilled in the art presumably are familiar with the structure, programming and operations of the various types of mobile stations. However, for the sake of completeness two types of mobile stations are described below with respect to FIGS. 5 and 6.

Figure 5:
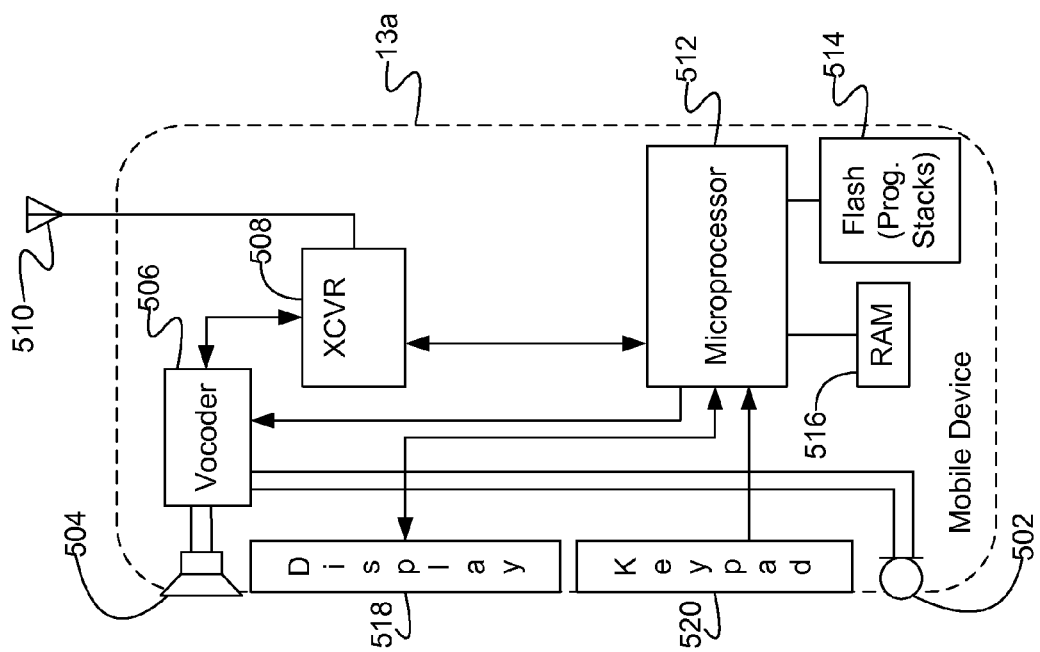
FIG. 5 is a high-level functional block diagram of an exemplary non-touch type mobile station, which may access an online business system.

FIG. 5 provides a block diagram illustration of an exemplary non-touch type mobile station 13a, which may correspond to the mobile station 13. Although the mobile station 13a may be a smart-phone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the mobile station 13a includes a microphone 502 for audio signal input and a speaker 504 for audio signal output. The microphone 502 and speaker 504 connect to voice coding and decoding circuitry (vocoder) 506. For a voice telephone call, for example, the vocoder 506 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13a also includes at least one digital transceiver (XCVR) 508. The mobile station 13a may be configured for digital wireless communications using one or more of the common network technology types. The concepts discussed here encompass embodiments of the mobile station utilizing any digital transceivers that conform to current or future developed digital wireless communication standards. The mobile station may also be capable of analog operation via a legacy network technology.

The transceiver 508 provides two-way wireless communication of information, such as vocoded speech samples and/or digital information, in accordance with the technology of the network 165. The transceiver 508 also sends and receives a variety of signaling messages in support of the various voice and data services provided via the mobile station 13a and the communication network. Each transceiver 508 connects through RF send and receive amplifiers (not separately shown) to an antenna 510. The transceiver may also support various types of mobile messaging services, such as short message service (SMS), enhanced messaging service (EMS) and/or multimedia messaging service (MMS).

The mobile station 13a includes a display 518 for displaying messages, menus or the like, call related information dialed by the user, calling party numbers, etc. A keypad 520 enables dialing digits for voice and/or data calls as well as generating selection inputs, for example, as may be keyed-in by the user based on a displayed menu or as a cursor control and selection of a highlighted item on a displayed screen. The display 518 and keypad 520 are the physical elements providing a textual or graphical user interface. Various combinations of the keypad 520, display 518, microphone 502 and speaker 504 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections.

A microprocessor 512 serves as a programmable controller for the mobile station 13a, in that it controls all operations of the mobile station 13a in accordance with programming that it executes, for all normal operations, including those under consideration here. In the example, the mobile station 13a includes flash type program memory 514, for storage of various "software" or "firmware" program routines and mobile configuration settings, such as mobile directory number (MDN) and/or mobile identification number (MIN), etc. The flash type program memory 514 stores programmed instructions, including those described herein. The mobile station 13a may include a non-volatile random access memory (RAM) 516 for a working data processing memory. Of course, other storage devices or configurations may be added to or substituted for those in the example. In a present implementation, the flash type program memory 514 stores firmware such as a boot routine, device driver software, an operating system, call processing software and vocoder control software, and any of a wide variety of other applications, such as client browser software and short message service software. The memories 514, 516 also store various data, such as telephone numbers and server addresses, downloaded data such as multimedia content, and various data input by the user. Programming stored in the flash type program memory 514, sometimes referred to as "firmware," is loaded into and executed by the microprocessor 512.

As outlined above, the mobile station 13a includes a processor, and programming stored in the flash memory 514 configures the processor so that the mobile station is capable of performing various desired functions, including those described herein.

Figure 6:
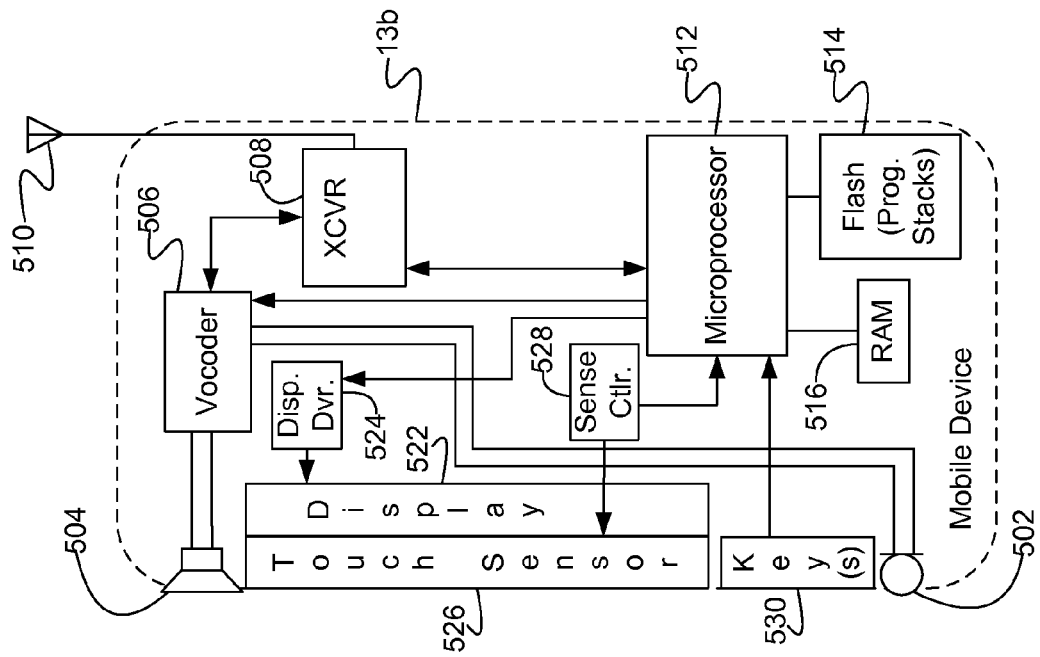
FIG. 6 is a high-level functional block diagram of an exemplary touch screen type mobile station which may access an online business system.

For purposes of such a discussion, FIG. 6 provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 6. For example, the touch screen type mobile station 13b includes a microphone 502, speaker 504 and vocoder 506, for audio input and output functions, much like in the earlier example. The mobile station 13b also includes at least one digital transceiver (XCVR) 508, for digital wireless communications, although the mobile station 13b may include an additional digital or analog transceiver. The concepts discussed here encompass embodiments of the mobile station 13b utilizing any digital transceivers that conform to current or future developed digital wireless communication standards. As in the mobile station 13a, the transceiver 508 provides two-way wireless communication of information, such as vocoded speech samples and/or digital information, in accordance with the technology of the network 165. The transceiver 508 also sends and receives a variety of signaling messages in support of the various voice and data services provided via the mobile station 13b and the network 165. Each transceiver 508 connects through RF send and receive amplifiers (not separately shown) to an antenna 510. The transceiver may also support various types of mobile messaging services, such as short message service (SMS), enhanced messaging service (EMS) and/or multimedia messaging service (MMS).

As in the example of the mobile station 13a, a microprocessor 512 serves as a programmable controller for the mobile station 13b, in that it controls all operations of the mobile station 13b in accordance with programming that it executes, for all normal operations, and for operations described herein. In the example, the mobile station 13b includes flash type program memory 514, for storage of various program routines and mobile configuration settings. The mobile station 13b may also include a non-volatile random access memory (RAM) 516 for a working data processing memory. Of course, other storage devices or configurations may be added to or substituted for those in the example. Hence, outlined above, the mobile station 13b includes a processor, and programming stored in the flash memory 514 configures the processor so that the mobile station is capable of performing various desired functions, including the functions described herein.

In the example of FIG. 6, the user interface elements included a display and a keypad. The mobile station 13b may have a limited number of key(s) 530, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 522, which the microprocessor 512 controls via a display driver 524, to present visible outputs to the device user. The mobile station 13b also includes a touch/position sensor 526. The sensor 526 is relatively transparent, so that the user may view the information presented on the display 522. A sense circuit 528 sensing signals from elements of the touch/position sensor 526 and detects occurrence and position of each touch of the screen formed by the display 522 and sensor 526. The sense circuit 528 provides touch position information to the microprocessor 512, which can correlate that information to the information currently displayed via the display 522, to determine the nature of user input via the screen.

The display 522 and touch sensor 526 (and possibly one or more keys 530, if included) are the physical elements providing the textual and graphical user interface for the mobile station 13b. The microphone 502 and speaker 504 may be used as user interface elements for audio input and output.

The structure and operation of the mobile stations 13a and 13b, as outlined above, were described to by way of example, only.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. In operation, the code is stored within the general-purpose computer platform. At other times, however, the software may be stored at other locations and/or transported for loading into the appropriate general-purpose computer system. Execution of such code by a processor of the computer platform enables the platform to implement the methodology described herein.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that the general structure and general operation of such equipment as shown in FIGS. 7 and 8 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIGS. 7 and 8). A mobile station type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the techniques for loading or storing the page at the content management server outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the templates 112, components 114, content management software & data 116, bridge 118, search indexing software & data 122, shopping cart functionality 132, ecommerce software & data 134, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Figure 9:
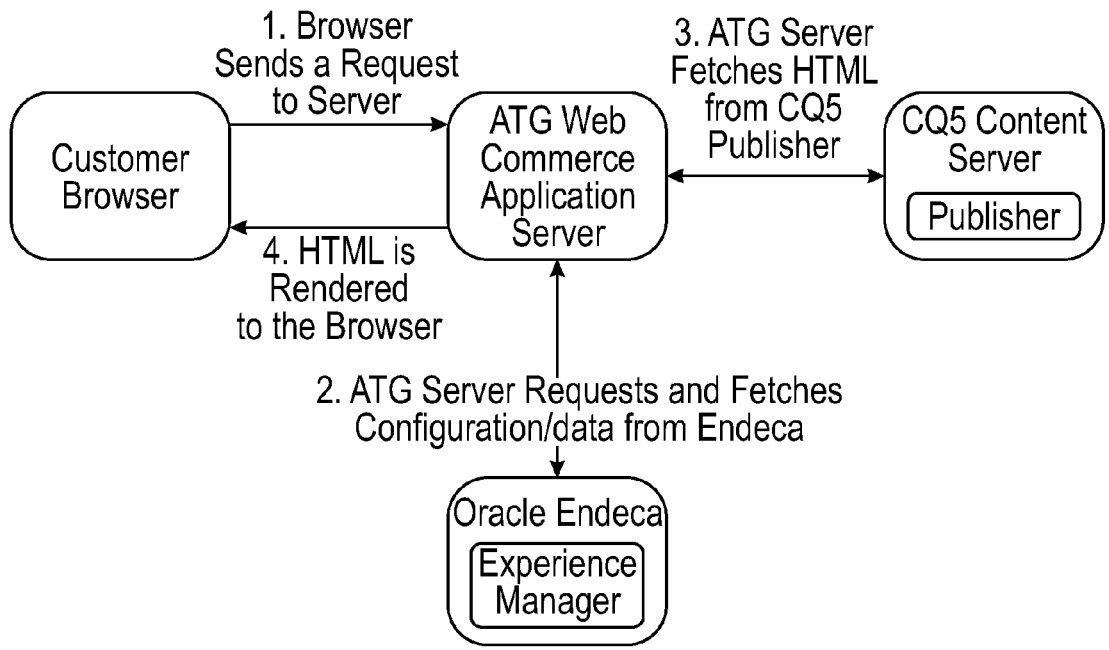
FIG. 9 illustrates an exemplary information flow between a browser of a customer device and servers in an online business system.

FIG. 9 illustrates an exemplary information flow between a browser at the customer browser (customer device 150) and the CQ5® Content server (the content management server 110), the Oracle Endeca® (the search/indexing server 120), and the ATG® web commerce application server (the ecommerce server 130). An ecommerce application (e.g., from among the ecommerce software & data 134) is deployed at ATG® web commerce application server (the ecommerce server 130). The content to be shown on the browser of the customer device (e.g., customer device 150) while executing the ecommerce application resides in the CQ5® content server (the content management server 110) in simple HTML format. The CQ5® uniform resource locator (URL) information where the content resides is configured in Oracle Experience Manager (at the Oracle Endeca® server, which corresponds to the search/indexing server 120). The ATG® server fetches the URL information from Endeca® and gets the content from the CQ5® content server. The content is then rendered to the browser at the customer device 150.

The ecommerce application may have ecommerce functionalities, such as adding products to shopping cart. However, content (e.g., text, images, description of products for sale, etc.) for the ecommerce application may be obtained from other servers that are not configured to interact with the ecommerce server that manages the shopping cart. For example, the content fetched with the flow discussed in FIG. 9 may be in plain HTML, which does not include data or instructions (for example, the ATG® session ID, dynSess-Conf) that are needed or desirable for the ATG® server to provide ecommerce functionality, such as the add to cart functionality. Since the HTML code resides on another server, the HTML may lack the ATG® specific information. Thus, adding to cart may result in a failure unless the communication gap between the servers is bridged as described herein.

In the flow described in FIG. 9, in some cases, ATG® information does not reside outside the ATG® web commerce application server (ecommerce server 130). ATG® information may be obtained by making, from the CQ5® content server or the customer's browser, an AJAX call once the page is loaded at the customer's browser. According to one solution, a unique ID of the product (SKU ID) is passed from the CQ5® content server to the ATG® server and the ATG® server generates the HTML page for that particular product with all the ATG® specific information based on the received unique ID of the product. Since the steps listed above are completed at the ATG® server, ATG® specific information may be generated together with the content provided to the customer's browser. The ATG® specific information may be provided to the CQ5® content server (content management server 110) using jQuery or another communication technique. As a result, an ecommerce functionality request at the page at the customer's browser, such as an "add to cart" request, may be completed through the ATG® form handlers of the ATG® server (ecommerce server 130) and content for the page may be sourced from the CQ5® content server. Alternatively, the ATG® information may reside outside the ATG® web commerce server, for instance, at the CQ5® content server, and may be provided directly to the customer's browser. However, this alternative might not be implemented, as it would require modifying a lot of the data stored at the CQ5® content server to include the ATG® information, and such modifying might be time consuming or expensive.

Figure 10:
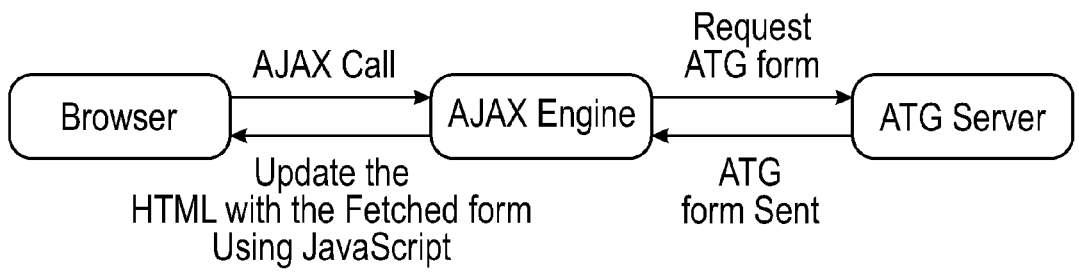
FIG. 10 illustrates an exemplary information flow between a browser of a customer device and an ecommerce server.

FIG. 10 illustrates an exemplary information flow between a browser of a customer device and an ATG® server (ecommerce server). The flow of FIG. 10 illustrates how a CQ5® form is dynamically replaced with an ATG® form containing the ATG® specific information for real-time data to be displayed in the browser. AJAX (Asynchronous JavaScript and XML) is used to create web applications that send and receive data from a server in the background without reloading the existing page and therefore not having to interfere with the display of the existing page. The subject technology, in some implementations, may facilitate integrating an ATG® form in a case where the HTML content is coming from a remote server. The ATG® form may be obtained without the need for the HTML content to be on the ATG® server. Thus, ATG® (ecommerce) functionalities may be separated from other functionalities. For example, ATG® functionalities may reside at a different server than CQ5® (content management) functionalities and Endeca® (search/indexing) functionalities.

Endeca® (search/indexing) functionalities include searching through metadata (e.g., product name, product ID, product price, etc.) that are not available in CQ5® (content management). The search functions provided by the CQ5® (content management) server are more primitive and are not as useful as those provided by the Endeca® (search/indexing) server because Endeca® has a more specialized search functionality. Thus, combining CQ5® and Endeca® may be desirable. Previously, CQ5® and Endeca® had not been combined because CQ5® and Endeca® implement incompatible programming languages, computing architectures, and software design schemes. According to some aspects of the subject technology, a bridge may be provided for a user to directly obtain the product name, price and all the other metadata by searching for the product using the product ID or product name. Thus, on search and select, all the information is populated from Endeca® to the user's browser, reducing effort required from the user. Using the bridge, the metadata may be synced between CQ5® and Endeca® every day (or other time period) to ensure that both software systems are up-to-date. The syncing may include checking for updates at CQ5® and propagating these updates to Endeca, and vice versa. As a result of using Endeca's search functionalities, "page not found" errors, and errors due to the user's spelling mistakes may be reduced due to the higher quality of Endeca's search functionality over CQ5's search functionality, as Endeca's search functionality is able to account for spelling mistakes (e.g., by searching for terms having a similar spelling to what was typed by the user), while CQ5's search functionality is not able to do this due to its more primitive nature. A bridge (e.g., bridge 118) may facilitate communication between CQ5® and Endeca. The bridge may implement Java code which includes software for communicating with CQ5® and software for communicating with Endeca. The bridge may also include software for communicating with ATG® (ecommerce server).

Figure 11:
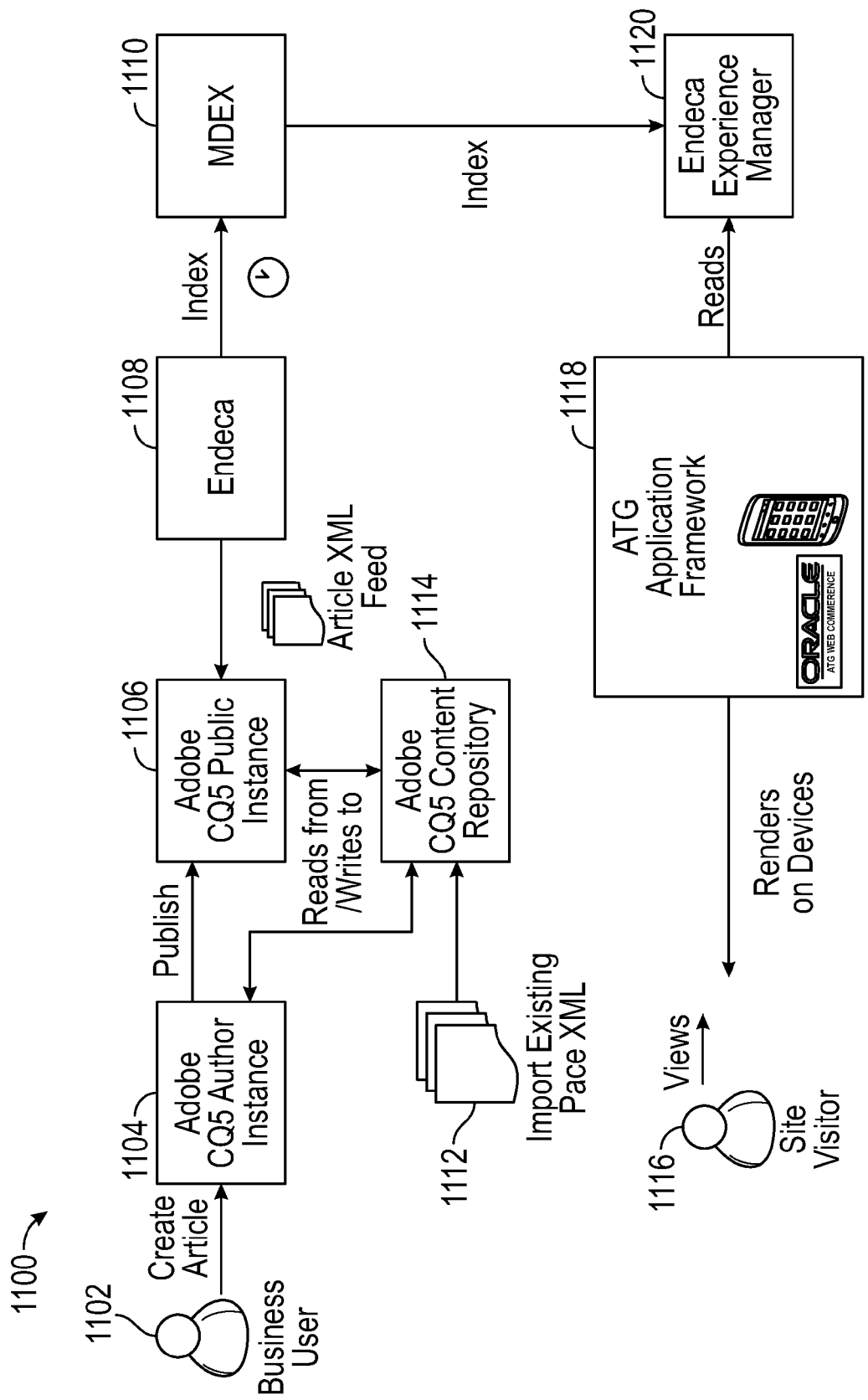
FIG. 11 illustrates an exemplary content management architecture.

FIG. 11 illustrates an exemplary content management (CQ5) architecture 1100. As illustrated in FIG. 11, a business user 1102 creates an article for storage in CQ5® using the Adobe CQ5® author instance 1104. The article may be a page describing a product for sale. The article is published by CQ5, creating the Adobe CQ5® publish instance 1106. The article is added to Adobe CQ5® content repository 1114 and existing page XML 1112 is imported, for the article, to Adobe CQ5® content repository 1114.

Endeca® 1108 (search/indexing server) accesses the article's XML feed and indexes the article in merchant direct exchange (MDEX) 1110, which is a search/analytical database for data indexed by Endeca® 1108. ATG® 1118 (ecommerce server) adds ecommerce functionalities to the article after reading the article through Endeca® experience manager 1120. When a site visitor 1116 accesses the article through ATG® 1118, the article renders on the site visitor's 1116 computing device allowing the site visitor 1116 to view the article.

Figure 12:
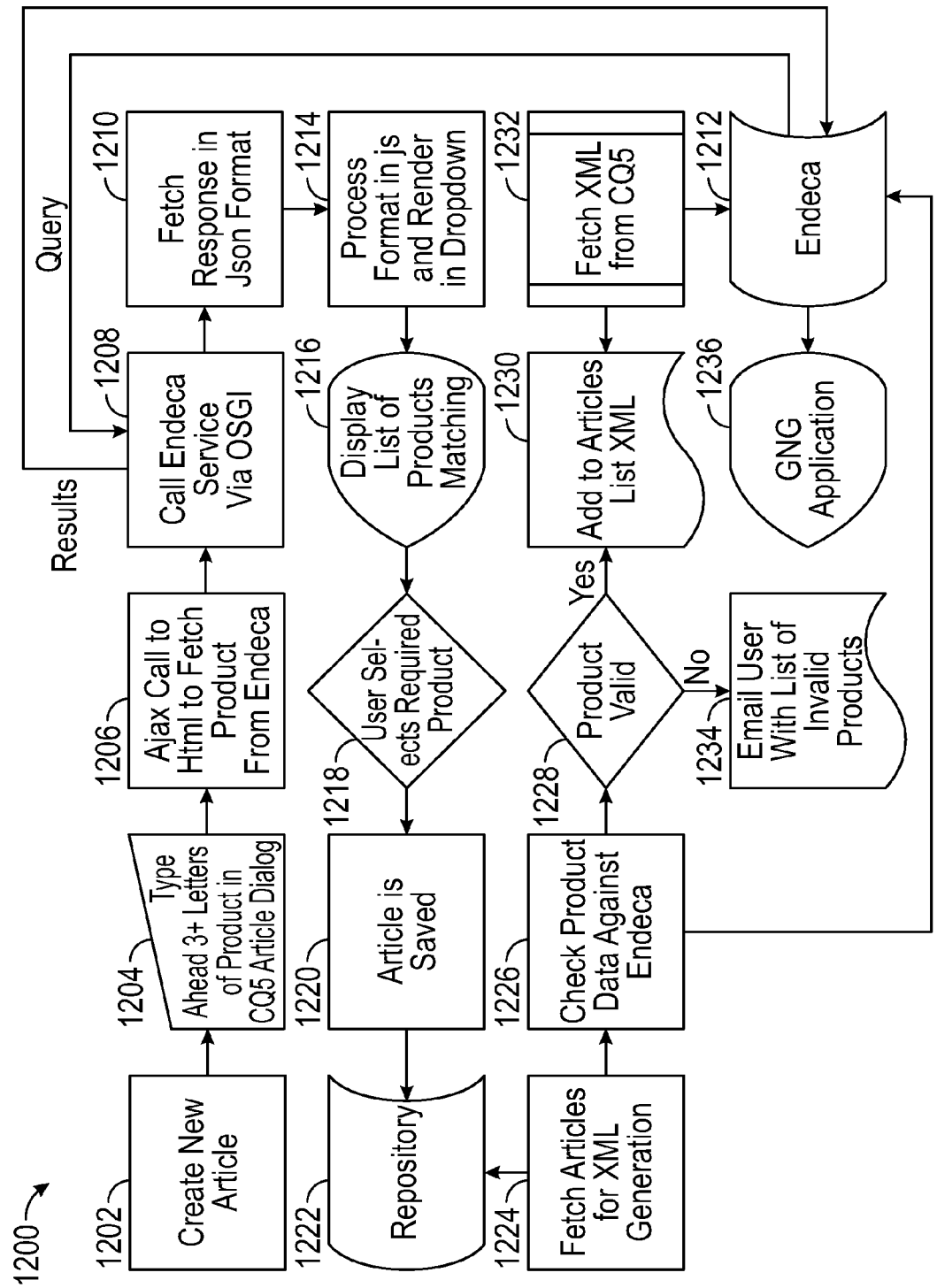
FIG. 12 illustrates an exemplary integration between the content management server and the search/indexing server to obtain products based on user type ahead input.

FIG. 12 illustrates an exemplary integration 1200 between CQ5® (the content management server) and Endeca® (the search/indexing server) to obtain products based on user type ahead input. The integration 1200 begins at step 1202 when a content developer device creates a new article. The new article may be, for example, a webpage describing a product.

In step 1204, a customer at a customer device types ahead three or more letters of a product name in the CQ5® article dialog (e.g., search input box). For example, a user may enter the three or more letters into a search input box to initiate a search.

In step 1206, an AJAX call is used to obtain HTML product information via Endeca. The AJAX call is sent from the CQ5® server to the Endeca® server. Alternatively, communication techniques different from AJAX may be used.

In step 1208, in response to the AJAX call, the Endeca® service is called via the Open Service Gateway Initiative (OSGI). The query is provided to Endeca® 1212, and Endeca® 1212 provides the results.

In step 1210, the response is fetched from Endeca® in JavaScript Object Notation (JSON) format. Alternatively, a format different from JSON may be used. In step 1214, the titles of the response pages/articles from the response are formatted in JavaScript and rendered in the dropdown. In step 1216, the list of matching products (a list of products in the response) is displayed.

In step 1218, the user selects the required product or the product in which the user is interested. In step 1220, the selected article, the article corresponding to the selected product, is saved to the repository 1222.

In step 1224, articles are obtained from CQ5® for XML generation. The obtained articles are provided to the repository 1222. In step 1226, product data is checked against Endeca® 1212.

In step 1228, it is determined whether a product associated with characters typed by the user exists. If so, the product is added to an article list XML file in step 1230 and the XML for the product's article (e.g., webpage) is obtained from CQ5® in step 1232. If not, the user may be notified (e.g., via email) that the query generates no valid results in step 1234. It should be noted that Endeca® 1212 has access to a get and go (GNG) application 1236, which is capable of providing real-time search results while the user is typing character(s) into the search input box.

Figure 13:
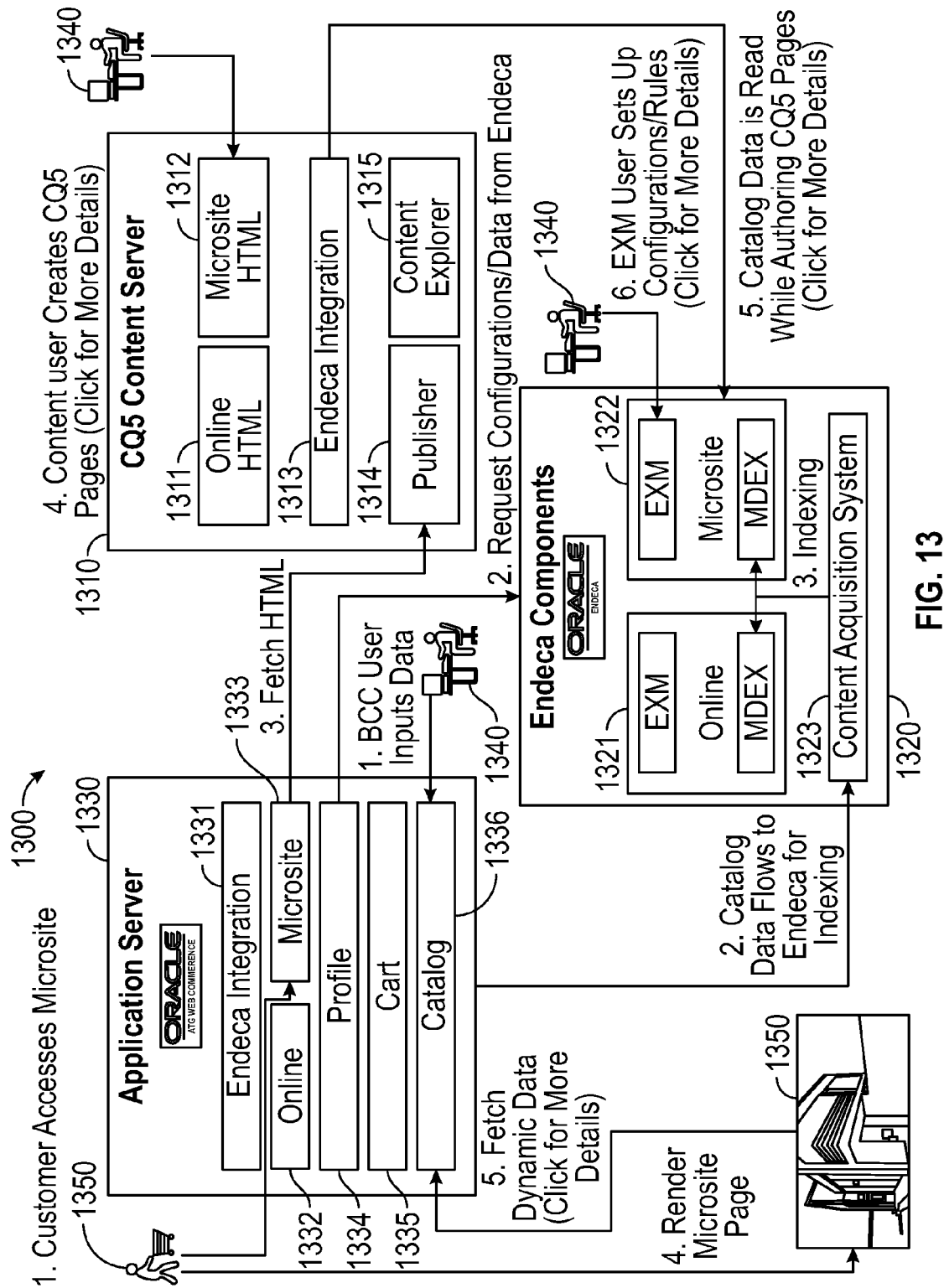
FIG. 13 illustrates an exemplary online commerce architecture.

FIG. 13 illustrates an exemplary online commerce architecture system 1300. As shown in FIG. 13, a customer 1310 accesses a microsite 1333 stored at an ATG® web commerce server 1330 (e.g., ecommerce server 130), and created by a business user 1340. The microsite requests configurations/data from Endeca® 1320 (e.g., search/indexing server 120) and obtains HTML from CQ5® 1310 (e.g., content management server 110). The microsite page is rendered at the customer's device 1350, which fetches dynamic data from the ATG® web commerce server 1330. The CQ5® content server 1310 is integrated with Endeca® 1320 via Endeca® integration 1313, and is able to access configurations/rules set up by the business user 1340 and stored at Endeca® 1320.

As illustrated in FIG. 13, the ATG® web commerce server 1330 stores Endeca® integration software for communicating with Endeca® 1320 (e.g., bridge 118), online software 1332 for indicating that the ATG® web commerce server 1330 is online, the microsite 1333, a profile 1334, a shopping cart 1335, and a catalog 1336. The catalog 1336 includes a list of products for sale inputted by the business user 1340.

As shown in FIG. 13, the CQ5@ content server 1310 stores online HTML 1311 indicating whether the CQ5@ content server is online, microsite HTML 1312 corresponding to the microsite 1333, Endeca® integration software 1313 (e.g., bridge 118) for communicating with Endeca® 1320, publisher software 1314 for fetching the HTML of the microsite 1333, and a content explorer 1315.

As illustrated in FIG. 13, Endeca® 1320 stores online software 1321, which includes EXM and MDEX, microsite software 1322, which includes EXM and MDEX, and a content acquisition system 1323. The content acquisition system 1323 indexes the content indexed by Endeca® 1320.

Figure 14:
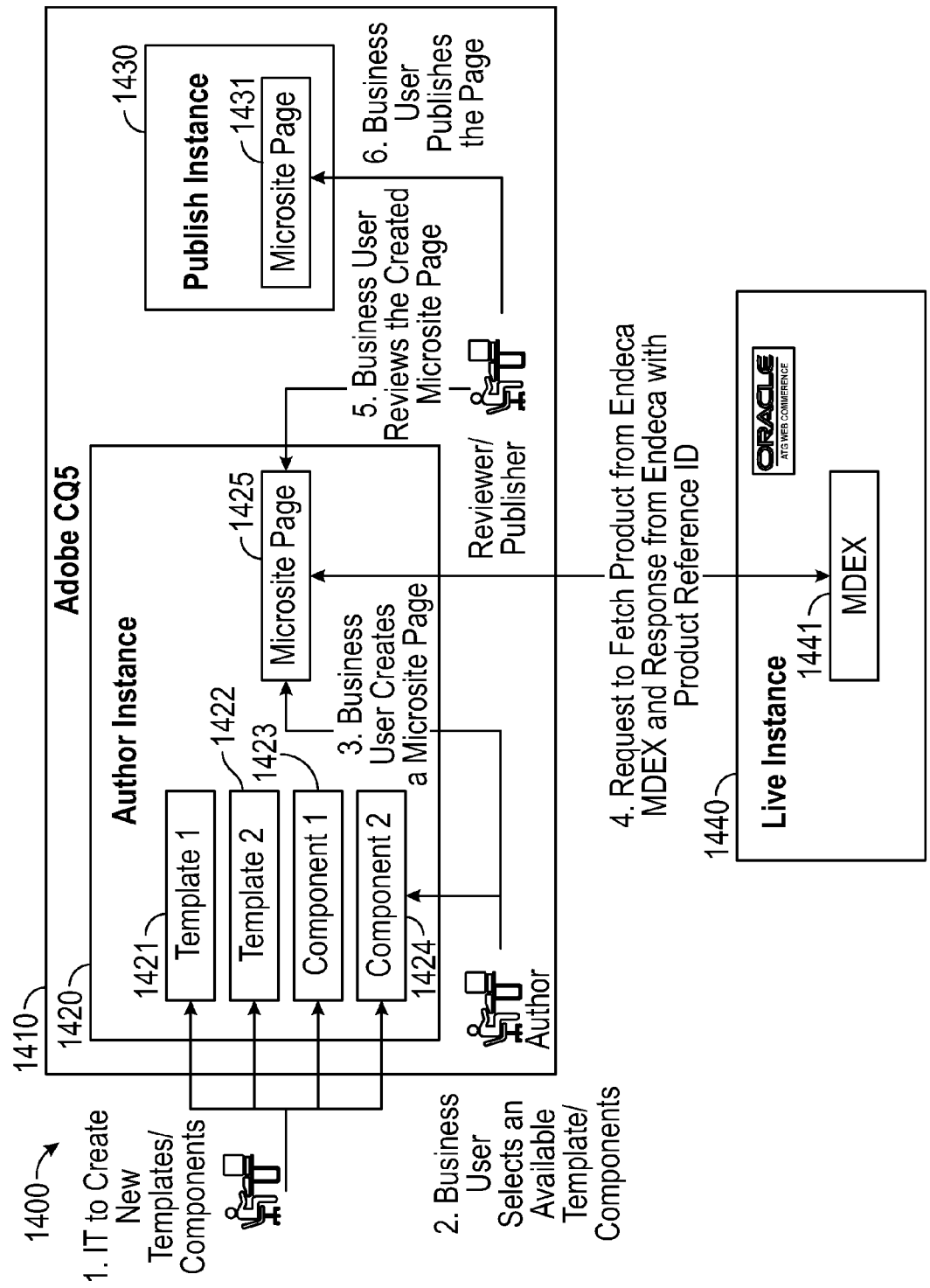
FIG. 14 illustrates an exemplary data flow for creating a CQ5® page with Endeca® integration.

FIG. 14 illustrates an exemplary data flow 1400 for creating a CQ5@ page with Endeca® integration. As shown in FIG. 14, information technology (IT) creates templates 1421 and 1422, and components 1423 and 1424 which are stored at the author instance of Adobe CQ5@ server 1410 (e.g., content management server 110). A business user selects an available template/component and uses that template/component to create a microsite page 1425. The author instance 1420 then requests to fetch the product from Endeca® merchant direct exchange (MDEX) 1441 at the live instance 1440 and receives a response from Endeca® MDEX 1441 with the product's reference ID. The business user then reviews the created microsite page 1425 and the business user publishes the microsite page 1425 to the microsite page 1431 in the publish instance 1430.

As illustrated in FIG. 14, Adobe CQ5@ 1410 stores the author instance 1420 and the publish instance 1430. The author instance includes the templates 1421 and 1422, the components 1423 and 1424, and the microsite page 1425. The publish instance includes the microsite page 1431. The live instance 1440 includes Endeca® MDEX 1441.

Figure 15:
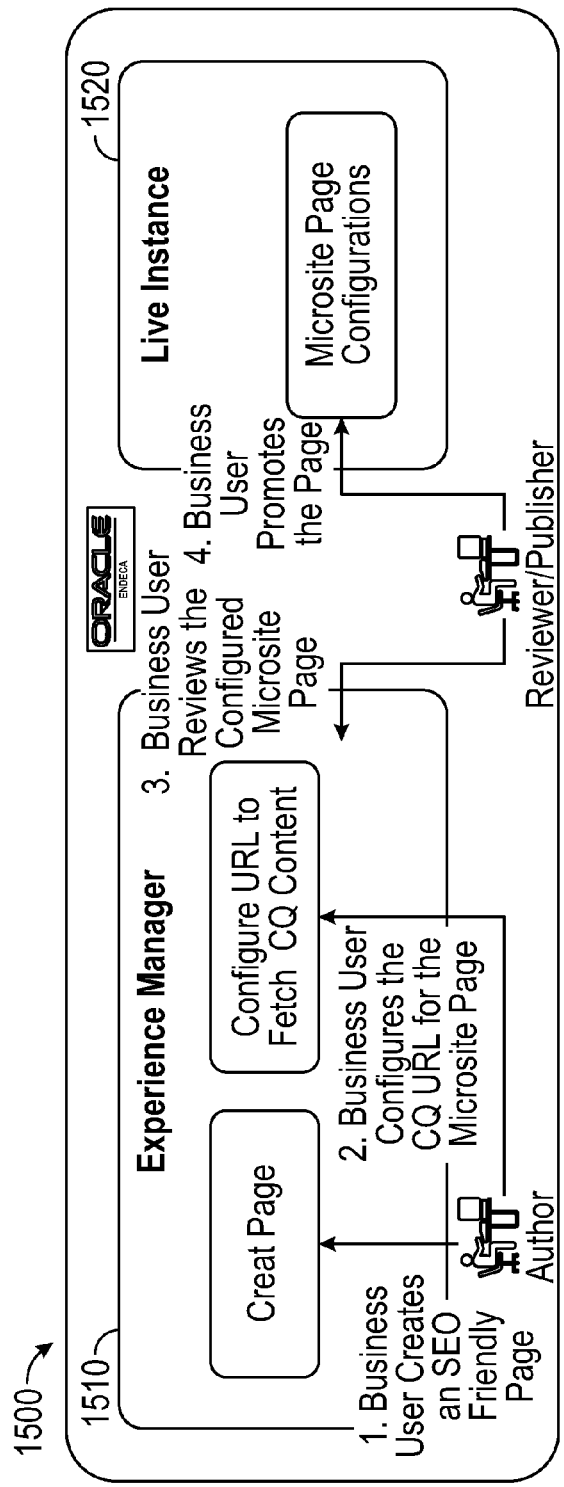
FIG. 15 illustrates an exemplary data flow for creating an Endeca® page.

FIG. 15 illustrates an exemplary data flow 1500 for creating an Endeca® page. As shown, the business user (e.g., author) creates a search engine optimization (SEO) friendly page at the experience manager 1510. The business user (e.g., author) configures the CQ5@ URL for the microsite page at the experience manager 1510. The business user (e.g., reviewer/publisher) reviews the configured microsite page at the experience manager 1510. The business user (e.g., reviewer/publisher) promotes the page to the live instance 1520.

Figure 16:
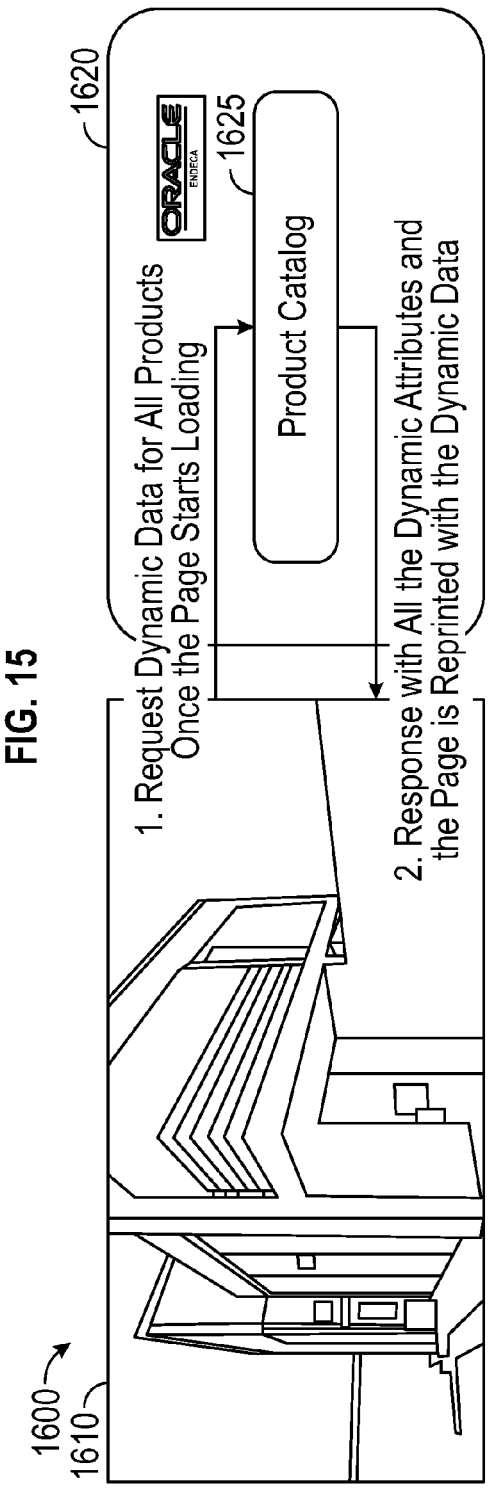
FIG. 16 illustrates an exemplary data flow for obtaining dynamic data from an Endeca® server.

FIG. 16 illustrates an exemplary data flow 1600 for obtaining dynamic data from an Endeca® server 1620. As shown, a browser 1610 at a customer device (e.g., customer device 150) is communicating with the Endeca® server 1620 (e.g., ecommerce server 130). The browser 1610 requests, from the Endeca® server 1620, dynamic data for all products to be presented in the page once the page starts loading in the browser 1610, for example, all of the products in the product catalog 1625 of Endeca® 1620. The browser 1610 receives, from the Endeca® server 1620, a response with all the dynamic attributes and the page is reprinted, at the browser 1610, with the dynamic data associated with the dynamic attributes.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at a content management server and from a customer device, a request for a page associated with a product for sale;
transmitting, from the content management server and to a search/indexing server, using a bridge, a request to find content for the page associated with the product, wherein the bridge resides at the content management server and communicates with software at the content management server, software at the search/indexing server, and software at an ecommerce server, and wherein the bridge includes software or hardware for communication between machines implementing incompatible software architectures or programming techniques;
receiving, at the content management server, a location of the content for the page associated with the product;
transmitting, from the content management server and to the ecommerce server, using the bridge, a request for ecommerce functionality for the page;
receiving, at the content management server and from the ecommerce server, using the bridge, the ecommerce functionality for the page; and
transmitting, from the content management server and to the customer device, data for loading the page associated with the product, the data for loading the page comprising the content for the page and the ecommerce functionality for the page;
wherein the bridge is used to sync metadata between the content management server and the search/indexing server.

2. The method of claim 1, wherein the content for the page comprises text and one or more images related to the product.

3. The method of claim 1, wherein the ecommerce functionality comprises functionality for adding the product to a shopping cart.

4. The method of claim 1, wherein the request for the ecommerce functionality comprises an AJAX call.

5. The method of claim 1, wherein the ecommerce functionality is received via a jQuery.

6. The method of claim 1, further comprising:
receiving, from the customer device, a request to implement the ecommerce functionality; and
transmitting, to the ecommerce server, a signal to handle the request to implement the ecommerce functionality.

7. The method of claim 1, further comprising accessing, by the content management server, the location of the content for the page associated with the product to provide the content for the page associated with the product to the customer device.

8. The method of claim 1, wherein the ecommerce functionality comprises at least one of billing and collection of shipping information.

9. A system comprising:
a processor;
a bridge; and
a memory comprising instructions which, when executed by the processor, cause the processor to:
receive, from a customer device, a request for a page associated with a product for sale;
transmit, to a search/indexing server, using the bridge, a request to find content for the page associated with the product, wherein the bridge communicates with software at the search/indexing server, and software at an ecommerce server, and wherein the bridge includes software or hardware for communication between machines implementing incompatible software architectures or programming techniques;
receive a location of the content for the page associated with the product;
transmit, to the ecommerce server, using the bridge, a request for ecommerce functionality for the page;
receive, from the ecommerce server, using the bridge, the ecommerce functionality for the page; and
transmit, to the customer device, data for loading the page associated with the product, the data for loading the page comprising the content for the page and the ecommerce functionality for the page;
wherein the bridge is used to sync metadata between the system and the search/indexing server.

10. The system of claim 9, wherein the content for the page comprises text and one or more images related to the product.

11. The system of claim 9, wherein the ecommerce functionality comprises functionality for adding the product to a shopping cart.

12. The system of claim 9, wherein the request for the ecommerce functionality comprises an AJAX call.

13. The system of claim 9, wherein the ecommerce functionality is received via a jQuery.

14. The system of claim 9, wherein the system stores one or more templates, and a content management software.

15. A method comprising:
receiving, at a content management server and from a content developer device, a page of content for an online business;
storing the page of content at the content management server;
transmitting, from the content management server and via a bridge, instructions for indexing the page of content at a search/indexing server, wherein the bridge resides at the content management server and communicates with software at the content management server, software at the search/indexing server, and software at an ecommerce server, and wherein the bridge includes software or hardware for communication between machines implementing incompatible software architectures or programming techniques;
transmitting, from the content management server and via the bridge, instructions for storing ecommerce information associated with the page of content at the ecommerce server;
publishing the page for display to at least one customer device accessing the content management server via a network; and
transmitting, from the content management server to the customer device, data for loading the page, the data for loading the page comprising ecommerce functionality for the page;

wherein the bridge is used to sync metadata between the content management server and the search/indexing server.

16. The method of claim 15, wherein the page of content is constructed using one or more templates or one or more components from the content management server.

17. The method of claim 16, further comprising transmitting, to the content developer device, the one or more templates or the one or more components.

18. The method of claim 15, wherein the page describes a product sold via the online business.

19. The method of claim 15, wherein the content management server, the search/indexing server, and the ecommerce server implement incompatible programming languages or computing architectures that are unable to communicate with one another, and wherein the bridge is compatible and able to communicate with the content management server, the search/indexing server, and at least a shopping cart of the ecommerce server.

20. The method of claim 15, wherein the ecommerce functionality comprises at least one of billing and collection of shipping information.

* * * * *

UNITED STATES PATENT AND TRADEMARK OFFICE
CERTIFICATE OF CORRECTION

Page 1 of 1

PATENT NO. : 10,019,746 B2
APPLICATION NO. : 14/556935
DATED : July 10, 2018
INVENTOR(S) : Sunil Joshua Alexander Konaiyagarri et al.

It is certified that error appears in the above-identified patent and that said Letters Patent is hereby corrected as shown below:

On the Title Page

Item [72], should read as follows:
[72] Inventors: Sunil Joshua Alexander Konaiyagarri, Piscataway, NJ (US); Bibhu Prasad Mahapatra, Monroe Township, NJ (US); Samar Chowdhury, Piscataway, NJ (US); Shashidhar Hiremath, Piscataway, NJ (US); Viswanadha Reddy Panga, Edison, NJ (US); Sheeba Baby, Somerset, NJ (US); Naveen Kumar Reddy Indurti, Irvine, CA (US)

Signed and Sealed this
Twenty-sixth Day of February, 2019

Andrei Iancu
*Director of the United States Patent and Trademark Office*